United States Patent
Garcia Reyero Vinas et al.

(10) Patent No.: US 10,688,727 B2
(45) Date of Patent: Jun. 23, 2020

(54) CONTROL DATA BASED ON SUB-REGIONS WITH NON-VARIABLE OBJECT PROPERTIES

(71) Applicant: HEWLETT-PACKARD DEVELOPMENT COMPANY, L.P., Houston, TX (US)

(72) Inventors: Juan Manuel Garcia Reyero Vinas, Sant Cugat del Valles (ES); Peter Morovic, Sant Cugat del Valles (ES); Jan Morovic, Colchester (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 60 days.

(21) Appl. No.: 15/545,249

(22) PCT Filed: Jan. 30, 2015

(86) PCT No.: PCT/EP2015/051961
§ 371 (c)(1),
(2) Date: Jul. 20, 2017

(87) PCT Pub. No.: WO2016/119888
PCT Pub. Date: Aug. 4, 2016

(65) Prior Publication Data
US 2018/0001569 A1 Jan. 4, 2018

(51) Int. Cl.
*B29C 64/393* (2017.01)
*G05B 19/4099* (2006.01)
*B33Y 50/02* (2015.01)

(52) U.S. Cl.
CPC ............ *B29C 64/393* (2017.08); *B33Y 50/02* (2014.12); *G05B 19/4099* (2013.01); *G05B 2219/49023* (2013.01)

(58) Field of Classification Search
CPC ........ G06T 9/001; B33Y 50/02; B29C 64/393
See application file for complete search history.

(56) References Cited

U.S. PATENT DOCUMENTS 5,920,682 A * 7/1999 Shu ...................... H04N 1/4058
358/1.9
6,180,049 B1 1/2001 Jang et al.
(Continued)

FOREIGN PATENT DOCUMENTS

| CN | 102279898 | 12/2011 |
| CN | 102950770 | 3/2013 |

(Continued)

OTHER PUBLICATIONS

D. Crispell, J. Mundy and G. Taubin, "A Variable-Resolution Probabilistic Three-Dimensional Model for Change Detection," in IEEE Transactions on Geoscience and Remote Sensing, vol. 50, No. 2, pp. 489-500, Feb. 2012. doi: 10.1109/TGRS.2011.2158439 (Year: 2012).*

(Continued)

*Primary Examiner* — Jennifer L Norton
(74) *Attorney, Agent, or Firm* — HP Inc. Patent Department

(57) ABSTRACT

Methods and apparatus associated with three-dimensional objects are described. In an example, a method comprises receiving data representing a three-dimensional model object, the data comprising object model data and object property data. For at least one object property, a sub-region of the object in which the object property is non-variable is identified and, for at least one location within the object, all sub-regions in which the location is situated are identified. Based on the combination of identified sub-regions for a location, print material data is determined for the location.

(Continued)

Control data for the production of a three-dimensional object is generated according to the print material data.

19 Claims, 2 Drawing Sheets

(56) References Cited

U.S. PATENT DOCUMENTS

| | | | |
|---|---|---|---|
| 8,525,834 B2 | 9/2013 | Salemann | |
| 8,817,332 B2* | 8/2014 | Wu | G06T 17/00 |
| | | | 358/3.11 |
| 9,700,259 B1* | 7/2017 | Nofsinger | A61B 5/4533 |
| 10,442,135 B2* | 10/2019 | Morovic | B33Y 50/00 |
| 10,479,121 B2* | 11/2019 | Morovic | B29C 64/393 |
| 10,500,790 B2* | 12/2019 | Morovic | B29C 64/393 |
| 2008/0108894 A1* | 5/2008 | Elgavish | G06T 7/0012 |
| | | | 600/420 |
| 2012/0106858 A1* | 5/2012 | Cai | G06T 9/001 |
| | | | 382/225 |
| 2013/0095302 A1 | 4/2013 | Pettis et al. | |
| 2014/0277661 A1 | 9/2014 | Amadio et al. | |
| 2014/0297014 A1 | 10/2014 | Iverson et al. | |
| 2014/0312535 A1 | 10/2014 | Dikovsky et al. | |
| 2014/0324204 A1* | 10/2014 | Vidimce | B29C 67/0088 |
| | | | 700/98 |
| 2015/0258770 A1* | 9/2015 | Chan | B33Y 50/02 |
| | | | 700/98 |
| 2015/0259548 A1* | 9/2015 | Wang | B33Y 50/02 |
| | | | 428/339 |
| 2018/0022029 A1* | 1/2018 | Morovic | B33Y 50/00 |
| | | | 700/98 |
| 2019/0009473 A1* | 1/2019 | Morovic | B33Y 50/02 |
| 2019/0279054 A1* | 9/2019 | Morovic | G06K 15/1878 |
| 2019/0337231 A1* | 11/2019 | Fan | B29C 64/386 |
| 2019/0349501 A1* | 11/2019 | Haik | H04N 1/4058 |
| 2019/0381735 A1* | 12/2019 | Morovic | G06F 30/00 |
| 2019/0389137 A1* | 12/2019 | Frohnmaier | B33Y 50/02 |

FOREIGN PATENT DOCUMENTS

| | | |
|---|---|---|
| CN | 103538257 | 1/2014 |
| CN | 103894608 | 7/2014 |
| CN | 103946889 | 7/2014 |
| CN | 104002482 | 8/2014 |
| CN | 104050714 | 9/2014 |
| CN | 104260344 | 1/2015 |
| CN | 104298086 | 1/2015 |
| WO | WO-2019221711 A1 * | 11/2019 |

OTHER PUBLICATIONS

Crispell et al., A Variable-Resolution Probabilistic Three-Dimensional Model for Change Detection, IEEE Transactions on Geoscience and Remote Sensing, Apr. 2011 (12 pages).

European Patent Office, International Search Report and Written Opinion for PCT/EP2015/051961 dated Jan. 13, 2016 (10 pages).

* cited by examiner

CONTROL DATA BASED ON SUB-REGIONS WITH NON-VARIABLE OBJECT PROPERTIES

BACKGROUND

Three-dimensional objects generated by an additive manufacturing process are formed in a layer-by-layer manner. In one example of additive manufacturing, the object is generated by coalescing and solidifying portions of layers of build material. In examples, the build material may be in the form of a powder, fluid or sheet material. The intended coalescence, solidification and/or physical properties may be achieved by printing an agent onto a layer of build material. Energy may be applied to the layer and the build material which is coated with the agent coalesces and solidifies upon cooling. In other examples, 3-D objects may be generated by using extruded plastics or sprayed materials as build materials which solidify to form an object.

Some printing processes for generating three-dimensional objects use control data generated from a model of a 3-D object. This control data may, for example, specify locations at which to apply an agent to a build material, or where a build material may itself be placed.

BRIEF DESCRIPTION OF DRAWINGS

For a more complete understanding, reference is now made to the following description taken in conjunction with the accompanying drawings in which.

DETAILED DESCRIPTION

Figure 1:
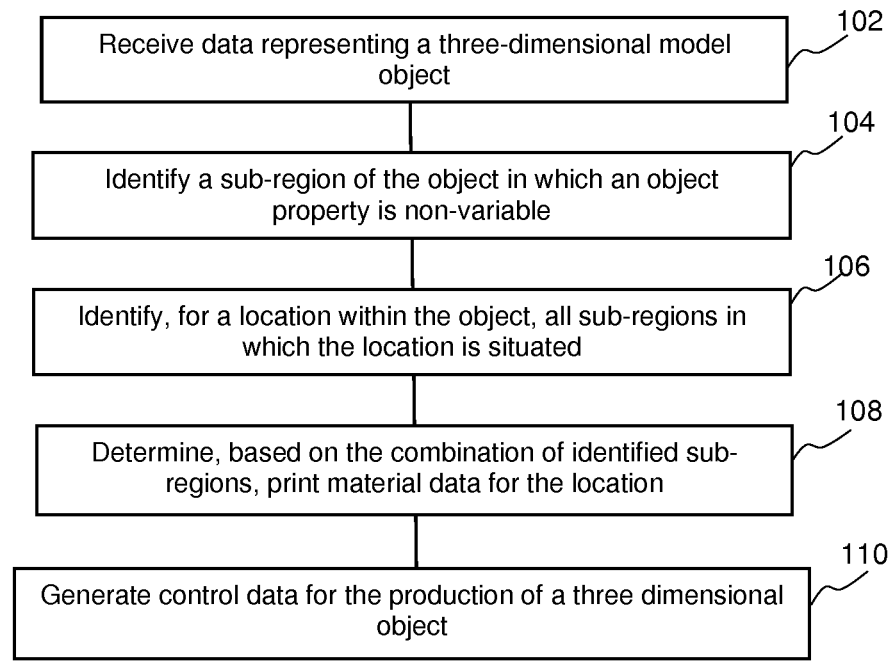
FIG. 1 is a flowchart of an example of a method for generating control data for production of a three-dimensional object.

Some examples described herein provide an apparatus and a method for generating control data that may be used to produce a three-dimensional object. Some examples allow arbitrary three-dimensional content with a variety of specified object properties to be processed and used to generate a three-dimensional object. These object properties may, for example, comprise appearance properties (color, transparency, glossiness, etc), conductivity, density, porosity and/or mechanical properties such as strength.

In some examples herein, three-dimensional space is characterised in terms of 'voxels', i.e. three-dimensional pixels, wherein each voxel occupies a discrete volume. When producing data modeling a three-dimensional object, a voxel at a given location may have at least one characteristic. For example, it may be empty, or may have a particular color, or comprise material having a particular density.

In some examples, print material data is generated for an object. Such print material data may, for example detail the amount of each of the available print materials (such as agent(s) to be printed onto a layer of the build material, or in some examples, build materials themselves), and their combination if needed. This may be specified as a proportional volume coverage (for example, X % of a region of a layer of build material should have agent Y applied thereto). Such print materials may be related to or selected to provided an object property such as, for example, color, transparency, flexibility, elasticity, rigidity, surface roughness, porosity, conductivity, inter-layer strength, density, and the like.

The actual location at which print materials (for example, a drop of agent) should be applied, as specified in control data, may be determined using halftoning techniques.

For example, a set of voxels within object model data may be associated with print material data, for example expressed as volume coverage vectors. In a simple case, such a vector may indicate that X % of locations in a given region in three-dimensional space should have one unit of a particular agent applied, whereas (100−X) % should be left clear of agent. The print material data may then provide the input for a 'halftoning' process to generate control data that may be used by an additive manufacturing system to produce a three-dimensional object. For example, it may be determined that, to produce specified material properties, 25% of a layer of build material (or of a portion of a layer) should have an agent applied thereto. The halftoning process determines where the drops of agent are to be deposited in order to provide the 25% coverage specified, for example by comparing each location to a threshold value provided in a halftone matrix.

In some examples, data representing a 3D structure or object is 'rasterized', i.e. converted to series of discrete locations. The rasterized data may be at the printable resolution of the 3D printing apparatus to which control data may be provided.

FIG. 1 shows a method for generating control data for production of a three-dimensional object. The method comprises receiving data representing a three-dimensional model object (block 102). In an example, the data comprises object model data, defining for example whether a voxel in a cuboid enclosing the object is populated or empty (i.e. the object exists or does not exist at that location) and object property data, specifying at least one object property parameter, such as color, strength, conductivity, transparency, etc. in association with a location.

In block 104, a sub-region of the object in which at least one object property is non-variable is identified. This may for example comprise a region which is all one colour, or a region which is all one density. In some examples, this is carried out for several, or all, object properties which are specified and thus a number of sub-regions, which could be overlapping and which may have different shapes and volumes may be identified. In some examples, the object property may be non-variable (or constant) even where there is a difference in object property data values. For example, object property data values with a certain range may be deemed to provide a non-variable object property. In some examples, this may be related to the constraints of object generating apparatus. In other examples, this may be user defined, for example specifying an acceptable loss in specificity between the object model data and the data to be generated.

In block 106, a location within the object is considered and all sub-regions in which the location is situated are found. The location may, for example, belong in a first sub-region relating to a particular shade of a particular color, and a second sub-region relating to a particular density.

In block 108, based on the combination of identified sub-regions, print material data is determined. This print material data may be defined implicitly and/or explicitly and may comprise any, or any combination of, amongst others: a value indicating an available build material is to be used; a color value; a flexibility value; an elasticity value; a rigidity value; a surface roughness value; a porosity value; a strength value; and a density value. For example, a direct or explicit definition may be of the form "place X % of material Y, Z % of material Q, . . . ". An indirect or implicit definition may specify a particular object property, e.g. a color of X or a rigidity of Y and this may be mapped to an explicit combination of available print materials.

Control data for the production of a three-dimensional object may then be determined according to the print material data (block 110). In some examples, there may be regions of the object in which all the object properties are the same. In such cases, the locations may be mapped to a common volume coverage representation vector object. Such vector objects may therefore vary in size; i.e. some may apply to larger regions of the object than others.

Figure 2:
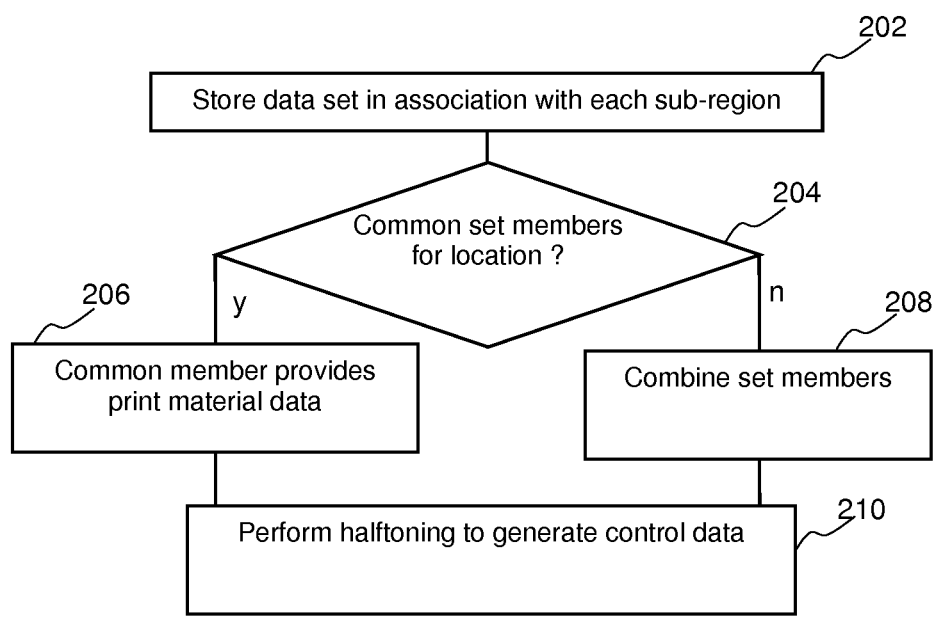
FIG. 2 is a flowchart of an example of part of a method for generating control data for production of a three-dimensional object.

FIG. 2 shows an example of parts of the method shown in FIG. 1 in greater detail. In this example, once a sub-region has been identified, a data set is stored in association therewith (block 202). The data set comprises at least one example of print material data indicating a print material or print material combination resulting in the non-variable object property. In particular example, all the examples of print materials or print material combinations resulting in the non-variable object property may be stored as members of the set. The members of the set may comprise alternative volume coverage representations. If, for example, a location is associated with a sub-region in which the non-variable property is color, but the object is also variable in terms of density, then the members of the set may comprise alternative volume coverage representations specifying proportions of agents which would result in the specified colour but a range of densities (in some examples, the range of densities represented in object model). Another sub-region may exist relating to the density at that location, and an associated set may have members comprising alternative volume coverage representations specifying proportions of agents which would result in the specified density but a range of colors (in some examples, the range of colors represented in object model). In other examples, there may be other, or further, two variables to consider in this manner.

In block 204, it is determined whether there is a common member within at least two (and in some examples, all) data sets stored for that location. If there is, this may be used to provide the print material data for the location (block 206). In mathematical terms, identifying such a common member may be referred to as finding the intersection of the data sets. If no common member can be found, in this example, members of data sets stored for identified sub-regions are combined to determine print material data for the location (block 208). If, for example, a member can be found in both a non-variable color and a non-variable density data set associated with the location, and another member can be found in both a non-variable color and a non-variable gloss data set associated with that location, but there is no common set member between all three data sets, members could be combined by carrying out a volumetric averaging of the two members. This may result in print material data providing the specified color (as both set members have this color) but an average of the gloss and density (which may be more or less glossy or dense than originally specified).

In block 210, control data is generated by halftoning. In one example, this comprises comparing a volume property representation to a threshold matrix such that the actual location at which drops of agent are deposited can be determined. In one example, the threshold values are for carrying out a halftone operation that compares a value of the threshold matrix against a value of a material (such as an agent(s)) or probability distribution such as a material volume coverage and chooses a single 'state'—material or ink-combination based on the threshold value.

Figure 3:
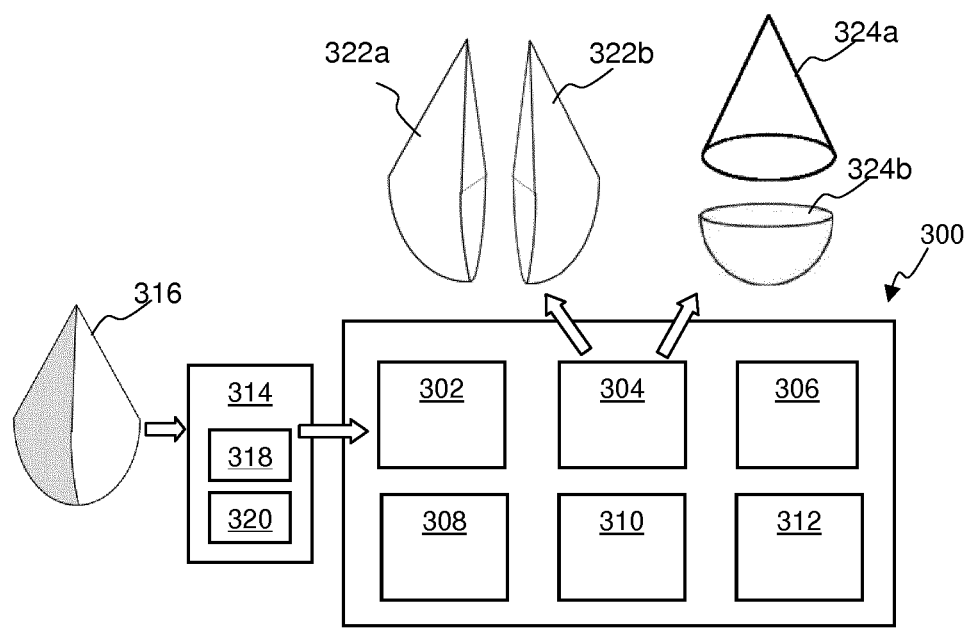
FIG. 3 is a simplified schematic of an example of apparatus for generating control data for production of a three-dimensional object.

FIG. 3 shows a processing apparatus which generates control data for production of a three-dimensional object. The apparatus 300 comprises an interface 302, a sub-region module 304, an image processor 306, a combining module 308, a separation generator 310, and a halftone module 312.

The interface 302 receives data 314 representing a three-dimensional model object 316. In the illustrated example, the object 316 is a self-righting round bottom cone. The rounded end of the cone is dense to effect self-righting. The cone is divided lengthways into two colors. In this example, therefore, the object is variable in terms of color and density, both of which may take one of two values. In other examples, the object 316 may be any form, and comprise any combination of properties, which may have a greater range of values associated therewith.

The data 314 comprises object model data 318 and object property data 320. The data may in some examples be data generated by a computer aided design (CAD) application. In this example, the object model data 318 defines the form of the object (i.e. where the object exists in three-dimensional space and where it does not). For example, the object model data 318 may comprise voxels that are defined in a three-dimensional (also referred to herein as [x,y,z]) space. A given voxel may have associated data that indicates whether a portion of the model object is present at that location.

In one example, the object property data 320 defines at least one object property for the three-dimensional object to be generated. For example, the object property data 320 may comprise a color or other object property for at least a portion of the object to be generated. The object property data 320 may also be used to define multiple object properties for a portion or portions of an object. Object properties other than color may include, for example, flexibility, elasticity, rigidity, surface roughness, porosity, inter-layer strength, density, conductivity, structure (for example, solid or structured) and the like, and may depend on the type of build material or agents used to generate an object.

The object property data 320 may comprise global and/or local object property data 320, e.g. certain object property values as defined in the object property data 320 may be associated with each voxel that defines the object and/or certain object property values may be associated with a set of voxels, e.g. ranging from individual voxels to all voxels associated with the object. In one example, the data representing the three-dimensional object comprises a model of a three-dimensional object that has at least one material property specified at every location within the model, e.g. at every [x, y, z] co-ordinate.

The sub-region module 304 is to identify regions of model object data having a constant (i.e. non-variable) object property. Some properties may be represented by a variable which is substantially continuous in nature (such as color), whereas other may be binary (for example, representing the presence or absence of a material) or have discrete values. In some examples, each object property that is to be taken into account is analysed in terms of its variety within the model. This can be done in a spatially independent way. The result may be a determination of a set of unique colors, a set of unique structures, a set of unique densities, and the like. For each of the properties, a spatially corresponding voxel representation may be constructed at the resolution needed to represent the determined variety. In such examples, a sub-region is equivalent to a voxel, and may be defined so as to be as large as possible given the specified properties (and in some examples the capabilities of an intended printing apparatus). As noted above, these sub-regions may vary in size and shape for different object properties. In this example, the object 316 comprises two color sub-regions 322a, 322b (both being half a round-bottom cone) and two density sub-regions 324a, 324b (a cone and a hemisphere).

In some examples, the sub-region module 304 determines, for each constant object property, a data set comprising, as members thereof, print material data resulting in the non-variable object property. Therefore, a data set for a sub-region defined for a particular density value may result in a set of print material combinations reflecting all colors in the object, each paired with the specified density value, and so on for all combinations of properties. In some cases, the set may not represent all combinations for the object. Instead, combinations which approximate specified object property data (for example, if a data value falls within a predetermined range) may be represented as members of the data set.

In this example, the image processor 306 accesses the obtained data and generates a rasterized representation of a plane of the three-dimensional model object 316. For example, the image processor 306 may generate slices of parallel planes of a model of the three-dimensional object which are then rasterized. Each slice may relate to at least a portion of a respective layer of build material in an additive manufacturing system. In a three-dimensional space that uses a three-coordinate system, e.g. that uses [x, y, z] co-ordinates, these parallel planes may be z-slices, i.e. planes that are parallel to x and y axes. Each z-slice may comprise portion(s) of a model that have a common z co-ordinate and that extend in the x and y dimensions. The number of z-slices may depend on a resolution of detail in the z dimension and/or the output resolution of a layer of build material.

In one example, the image processor 306 outputs a plurality of two-dimensional raster objects, each representing a plane of the three-dimensional space in which the model object is defined. Each of these two-dimensional raster objects may comprise an image such as a bitmap. In this case, the image processor associates at least one object property value with each location in the raster object. For example, each raster object may comprise a set of pixels that extend in the x and y dimensions; each pixel may then be associated with at least one object property value. In one case, each pixel may be associated with at least one object property. In the case that one of the object properties defines a color, the color may be defined in a color space, such as: a monochrome contone space, e.g. grayscale; a Red, Green, Blue (RGB) color space; the International Commission on Illumination (CIE) 1931 XYZ color space, wherein three variables ('X', 'Y' and 'Z' or tristimulus values) are used to model a color; the CIE 1976 (L*, a*, b*—CIELAB or 'LAB') color space, wherein three variables represent lightness ('L') and opposing color dimensions ('a' and 'b'); or any other color space or derived color space. A color value in these color spaces may comprise a continuous tone value, e.g. a value within a predefined range of values. For example, in a simple case, an RGB color value may comprise three 8-bit values; as such each red, green and blue value may be within the range of 0 to 255.

The combining module 308 identifies, for each location, all associated sub-regions and to determine print material data at the location based on the combination of identified sub-regions. If a data set has been determined as outlined above, the combining module 308 may, in some examples, identify if any member exists in the data set stored for each sub-region associated with the location and, if so, to use the member to provide print material data for the location or, if no member is common to all sets, to determine similar members and combine the proportions specified therein to determine the print material data for the location, in some examples as set out in FIG. 2. In this example, the combining module 308 received the two dimensional raster objects although in other examples it may receive data directly from the interface 302.

The separation generator 310 maps locations to a volume coverage representation. In some examples, the separation generator 310 may map locations having common print material data to a common vector object. In one case the separation generator 310 maps a material property to a volume coverage vector. In some examples, the separation generator 310 may receive raster objects as described above. These may be received one by one, e.g. in an order representative of an ascending height of the object, or as a collection, e.g. all slices of the model object.

A volume coverage vector may have a plurality of values, wherein each value defines a proportion for each material (a "material primary" or MP) in an addressable area of a layer of the three-dimensional object. For example, in an additive manufacturing system with two available materials—M1 and M2, where each material may be independently deposited in an addressable area of a layer of the three-dimensional object, there may be $2^2$ (i.e. four) proportions in a given volume coverage vector: a first proportion for M1 without M2; a second proportion for M2 without M1; a third proportion for an over-deposit of M1 and M2, e.g. M2 deposited over M1 or vice versa; and a fourth proportion for an absence of both M1 and M2. In this case an volume coverage vector may be: [M1, M2, M1M2, Z] or with example values [0.2, 0.2, 0.5, 0.1]—i.e. in a given [x, y] location in a z slice, 20% M1 without M2, 20% M2 without M1, 50% M1 and M2 and 10% empty. As each value is a proportion and the set of values represent the available material combinations, the set of values in each vector sums to 1 or 100%.

In an example, for a given layer (z coordinate) of the object, each x, y coordinate may be included in the rasterized representation. From this, all the sub-regions which relate to the coordinate can be found (along with, in some examples, any other property not associated with a sub-region). Values for the respective properties can be found, independently from the size of the sub-region, and used to form a multi-dimensional object. In some examples, where multiple sets are stored, these sets provide a multidimensional lookup table for defining the object.

This may result, for example, in set of proportion values specifying for example [red, green, blue, conductivity, elasticity, etc].

The spatial detail is therefore specified at each location (possibly in terms of the smallest addressable volume for printing), but print material data is not, instead being expressed at the level of sub-regions. This allows for a reduction in data file size in order to represent the model, and can improve processing speeds. It also means that, should an object property be altered within a model, new sub-regions can be identified for the property and new combinations computed, but the sub-regions for unaffected properties need not be recomputed. The halftone module 312 to carry out halftoning of a plane of a three-dimensional object to be generated. In some examples, the halftone module 312 may use a thresholding matrix to carry out halftoning, the thresholding matrix being structured to affect at least one object property.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and functional modules may all be performed by a single processor or divided amongst several processors.

Such machine readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 4:
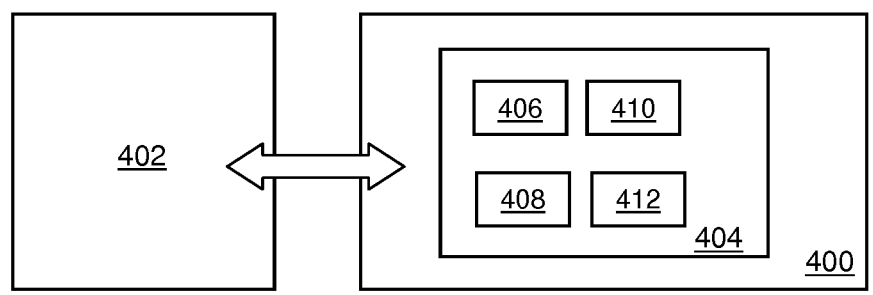
FIG. 4 is a simplified schematic of an example of a processor and a memory.

FIG. 4 shows an example of a processor 400 associated with a memory 402. The memory comprises computer readable instructions 404 which are executable by the processor 400. The instructions 404 comprise:

Instructions 406 to identify, from data representing a three-dimensional model object as a plurality of addressable location, sub-regions of the object in which an object property is non-variable;

Instructions 408 to identify, for each location, all sub-regions in which the location is situated;

instructions 410 to determine, for each location, based on the combination of identified sub-regions, print material data indicating at least one print material to be deposited at the location; and instructions 412 to map locations to print material volume coverage vectors such that locations occupying the same set of sub-regions are mapped to a common volume coverage vector.

Such machine readable instructions may also be loaded onto a computer or other programmable data processing devices, so that the computer or other programmable data processing devices perform a series of operations to produce computer-implemented processing, thus the instructions executed on the computer or other programmable devices provide a operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfill the functions of several units recited in the claims.

The features of any dependent claim may be combined with the features of any of the independent claims or other dependent claims.

The invention claimed is:

1. A method performed by a system comprising a processor, comprising:

receiving data representing a three-dimensional (3D) model object, the data comprising object model data and object property data;

identifying, for a location within the 3D model object, a first sub-region in the location, wherein a first object property in the first sub-region is non-variable;

identifying, for the location, a second sub-region in the location, wherein a second object property in the second sub-region is non-variable;

determining a first data set associated with the first sub-region, wherein members of the first data set comprise alternative volume coverage representations resulting in the first object property that is non-variable in the first sub-region and another object property that is variable in the first sub-region;

determining a second data set associated with the second sub-region, wherein members of the second data set comprise alternative volume coverage representations resulting in the second object property that is non-variable in the second sub-region and another object property that is variable in the second sub-region;

determining whether a common member exists in the first and second data sets;

in response to determining that the common member exists in the first and second data sets, using the common member to derive print material data for the location;

in response to determining that the common member does not exist in the first and second data sets, combining the members of the first and second data sets to derive the print material data for the location; and generating control data for producing a 3D object according to the print material data by an additive manufacturing system.

2. The method of claim 1, comprising determining a data set associated with each respective sub-region of the first and second sub-regions, wherein each member of the data set comprises a volume coverage vector resulting in a non-variable object property and a variable object property of the respective sub-region.

3. The method of claim 2, wherein the data set comprises a plurality of volume coverage vectors resulting in the non-variable object property and the variable object property for the respective sub-region.

4. The method of claim 1, comprising mapping locations within the 3D model object having a same print material data to a common vector object.

5. The method of claim 1, wherein generating the control data comprises halftoning by comparing volume coverage representations of the location to a halftone thresholding matrix.

6. A system comprising:
a processor; and
a non-transitory storage medium storing instructions executable on the processor to:
receive data representing a three-dimensional (3D) model object, the data comprising object model data and object property data;
identify, within a location in the 3D model object, a first sub-region having a non-variable first object property, and a second sub-region having a non-variable second object property;
determine a first data set associated with the first sub-region, wherein members of the first data set comprise alternative volume coverage representations resulting in the non-variable first object property in the first sub-region and another object property that is variable in the first sub-region;
determine a second data set associated with the second sub-region, wherein members of the second data set comprise alternative volume coverage representations resulting in the non-variable second object property in the second sub-region and another object property that is variable in the second sub-region;
determine whether a common member exists in the first and second data sets;
in response to determining that the common member exists in the first and second data sets, use the common member to derive print material data for the location;
in response to determining that the common member does not exist in the first and second data sets, combine the members of the first and second data sets to derive the print material data for the location; and
carry out halftoning to generate control data for production of a 3D object by an additive manufacturing system according to the print material data.

7. The system of claim 6, wherein the instructions are executable on the processor to determine, for each respective sub-region of the first and second sub-regions, a data set, wherein each member of the data set comprises a volume coverage vector resulting in a non-variable object property and a variable object property of the respective sub-region.

8. The system of claim 6, wherein the instructions are executable on the processor to map locations relating to common print material data to a common vector object.

9. The system of claim 6, wherein the instructions are executable on the processor to use a thresholding matrix to carry out the halftoning.

10. A non-transitory computer readable storage medium comprising instructions that upon execution cause a system to:

identify, from data representing a three-dimensional (3D) model object, plural sub-regions in a location of the 3D model object, wherein the plural sub-regions include a first sub-region in which a first object property is non-variable, and a second sub-region in which a second object property is non-variable;
determine a first data set associated with the first sub-region, wherein members of the first data set comprise alternative volume coverage representations resulting in the first object property that is non-variable in the first sub-region and another object property that is variable in the first sub-region;
determine a second data set associated with the second sub-region, wherein members of the second data set comprise alternative volume coverage representations resulting in the second object property that is non-variable in the second sub-region and another object property that is variable in the second sub-region;
determine whether a common member exists in the first and second data sets;
in response to determining that the common member exists in the first and second data sets, use the common member to derive print material data for the location;
in response to determining that the common member does not exist in the first and second data sets, combine the members of the first and second data sets to derive the print material data for the location; and
use the print material data to produce control data that controls production of a 3D object by an additive manufacturing system.

11. The method of claim 1, wherein the combining of the members of the first and second data sets comprises averaging the members of the first and second data sets.

12. The method of claim 1, wherein the first object property that is non-variable in the first sub-region is color.

13. The method of claim 12, wherein the second object property that is non-variable in the second sub-region is selected from among transparency, glossiness, conductivity, porosity, and strength.

14. The system of claim 6, wherein the non-variable first object property is selected from among color, transparency, glossiness, conductivity, porosity, and strength.

15. The system of claim 6, wherein the combining of the members of the first and second data sets comprises computing an average of the members of the first and second data sets to derive the print material data.

16. The method of claim 1, wherein the determining that the common member exists in the first and second data sets is based on finding an intersection between the first and second data sets.

17. The system of claim 6, wherein the determining that the common member exists in the first and second data sets is based on finding an intersection between the first and second data sets.

18. The non-transitory computer readable storage medium of claim 10, wherein the determining that the common member exists in the first and second data sets is based on finding an intersection between the first and second data sets.

19. The non-transitory computer readable storage medium of claim 10, wherein the alternative volume coverage representations in the first data set specify proportions of agents that result in the first object property that is non-variable in the first sub-region and the another object property that is variable in the first sub-region, and
wherein the alternative volume coverage representations in the second data set specify proportions of agents that result in the second object property that is non-variable in the second sub-region and the another object property that is variable in the second sub-region.

* * * * *